United States Patent
Chen

(10) Patent No.: US 7,795,560 B2
(45) Date of Patent: Sep. 14, 2010

(54) APPARATUS FOR PROCESSING WORK-PIECE

(75) Inventor: Ga-Lane Chen, Santa Clara, CA (US)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 1080 days.

(21) Appl. No.: 11/309,353

(22) Filed: Jul. 31, 2006

(65) Prior Publication Data
US 2007/0114213 A1   May 24, 2007

(30) Foreign Application Priority Data
Nov. 18, 2005   (TW)   ............................. 94140613 A

(51) Int. Cl.
*B23K 26/06* (2006.01)
(52) U.S. Cl. ............................. 219/121.75; 219/121.73; 219/121.61
(58) Field of Classification Search ............ 219/121.75, 219/121.73, 121.61, 121.62, 121.83; 359/754, 359/362, 721
See application file for complete search history.

(56) References Cited

U.S. PATENT DOCUMENTS

| | | | |
|---|---|---|---|
| 3,736,402 A * | 5/1973 | Mefferd et al. ......... | 219/121.67 |
| 3,817,604 A * | 6/1974 | Watt ........................... | 359/748 |
| 4,402,574 A * | 9/1983 | McConnel .................. | 359/667 |
| 4,700,045 A * | 10/1987 | Merry et al. ............ | 219/121.78 |
| 4,769,523 A | 9/1988 | Tanimoto et al. | |
| 4,806,732 A * | 2/1989 | Abshire et al. ......... | 219/124.34 |
| 5,038,016 A | 8/1991 | Robertson et al. | |
| 5,065,330 A * | 11/1991 | Karube et al. ............... | 700/166 |
| 5,272,312 A * | 12/1993 | Jurca ..................... | 219/121.83 |
| 5,360,960 A * | 11/1994 | Shirk .................... | 219/121.83 |
| 5,430,475 A * | 7/1995 | Goto et al. .................... | 348/65 |
| 5,475,197 A * | 12/1995 | Wrobel et al. ......... | 219/121.69 |
| 6,039,517 A * | 3/2000 | Charewicz .................. | 409/135 |
| 6,392,192 B1 * | 5/2002 | Cole et al. ............. | 219/121.83 |
| 6,667,456 B2 | 12/2003 | Mukasa et al. | |
| 6,740,847 B1 * | 5/2004 | Horsting .................. | 219/121.7 |

\* cited by examiner

*Primary Examiner*—M. Alexandra Elve
(74) *Attorney, Agent, or Firm*—Jeffrey T. Knapp

(57) ABSTRACT

An apparatus for processing a work-piece (80) includes a laser source (102) and a first lens assembly (108). The laser source is configured for emitting laser beams. The first lens assembly is configured for adjustably focusing the laser beams onto the work-piece. The first lens assembly is disposed in optical alignment with the laser source and includes a first lens set having a positive refractive power and a second lens set having a negative refractive power. Because of the first lens assembly, the laser beams emitted from the laser source can be focused accurately onto the work-piece, and then the apparatus for processing the work-piece has accurately focused laser beams as a result.

10 Claims, 2 Drawing Sheets

APPARATUS FOR PROCESSING WORK-PIECE

CROSS-REFERENCE TO RELATED APPLICATIONS

This application is related to commonly-assigned copending applications entitled, "laser system and method for patterning mold inserts using same", filed Jul. 28, 2009 Ser. No. 11/309,343, and "laser welding system for welding work-piece", filed on Jun. 23, 2006 (U.S. application Ser. No. 11/473,965). Disclosures of the above identified applications are incorporated herein by reference.

FIELD OF THE INVENTION

The present invention relates to processing apparatuses and, more particularly, to an apparatus for processing a work-piece.

DESCRIPTION OF RELATED ART

Lasers have been used for marking and machining of materials since shortly after their invention. Established techniques include laser cutting, laser drilling, and laser welding. These techniques have been applied to a wide range of materials including metals, ceramics, polymers, and natural products such as cotton and paper.

When using lasers to machine a work-piece, the laser beam from a laser source is focused onto the work-piece with a lens assembly. Typically, it is at the focal point of the lens, where the laser beam is the smallest and hence the most concentrated, that the work-piece is machined. The distance between the lens and its focal point is fixed by the dimensions and specification of the lens, and is constant for any given lens and any given laser beam.

During the machining process, the work-piece is moved under the fixed laser beam such that the features are machined according to the wanted design. Alternatively, the work-piece can be stationary and the laser focus can move. Of critical importance for the best possible machining parameters is to have the work-piece at a constant distance from the lens to keep its surface within the working focal range. In most cases, laser machining is performed on flat work-pieces.

If the work-piece has deformations along the laser beam axis, the laser will be caused to go out of focus on the work-piece, such that the laser will not properly machine in that area. Even if the work-piece is fastened to a holder or substrate, deformations due to the heat damage of the laser or preexisting deformations may result in that region of the work-piece being unmachinable. Similarly, it becomes difficult to machine work-pieces with curved surfaces.

What is needed, therefore, is a laser machining apparatus capable of accurately focusing laser beams and controlling the laser source.

SUMMARY OF THE INVENTION

In a preferred embodiment of the present invention, An apparatus for processing a work-piece includes a laser source and a first lens assembly. The laser source is configured for emitting laser beams. The first lens assembly is configured for adjustably focusing the laser beams onto the work-piece. The first lens assembly is disposed in optical alignment with the laser source and includes a first lens set having a positive refractive power and a second lens set having a negative refractive power. A distance between the lens sets of the first lens assembly satisfy the following equation:

$$d12=(k1+k2-k12)/(k1 \times k2).$$

Wherein k1 represents an index of refraction of the first lens set, k2 represents an index of refraction of the second lens set, k12 represents an index of refraction of the first lens assembly, and an effective focal length f1 of the first lens assembly satisfies the following equation:

$$f1=1/k12.$$

A back focal length f2 of the first lens assembly satisfies the following equation:

$$f2=(1-d12 \times k1)/k12=f1 \times (1-d12 \times k1).$$

Because of the first lens assembly, the laser beams emitted from the laser source can be focused accurately onto the work-piece, and then the apparatus for processing the work-piece can maintain accurate focusing of the laser beams.

Advantages and novel features will become more apparent from the following detailed description of the present laser machining system and laser machining method, when taken in conjunction with the accompanying drawings.

BRIEF DESCRIPTION OF THE DRAWINGS

Many aspects of the apparatus for processing a work-piece can be better understood with reference to the following drawings. The components in the drawings are not necessarily drawn to scale, the emphasis instead being placed upon clearly illustrating the principles of the present laser machining system. Moreover, in the drawings, like reference numerals designate corresponding parts throughout the several views.

DETAILED DESCRIPTION OF THE INVENTION

Reference will now be made to the drawings to describe preferred embodiments of the apparatus for processing work-pieces.

Figure 1:
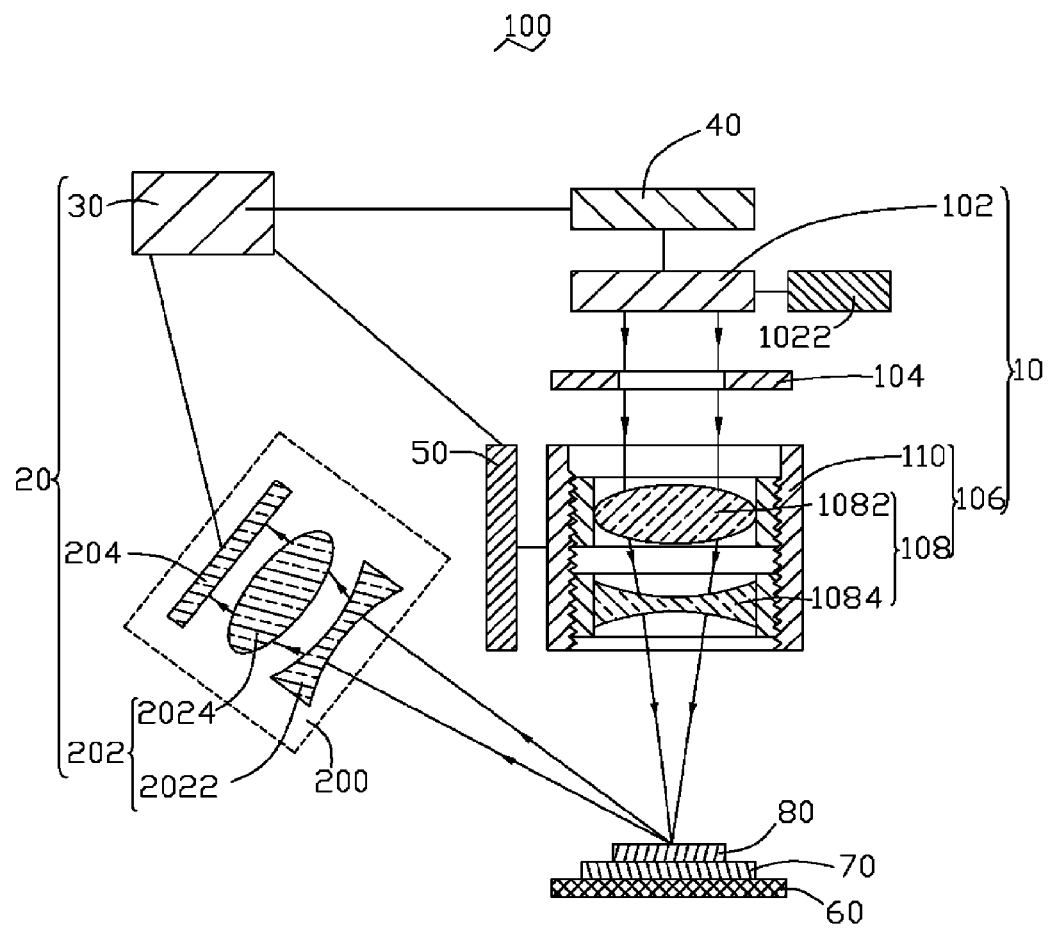
FIG. 1 is a schematic, perspective view of an apparatus for processing a work-piece in accordance with a preferred embodiment.

FIG. 1 illustrates an apparatus for processing the work-piece 100 in accordance with a preferred embodiment. The apparatus for processing a work-piece 100 is used for machining a work-piece 80. The apparatus for processing a work-piece 100 includes a laser source module 10, a feedback module 20 and a laser-controlling module 40.

The laser source module 10 includes a laser source 102, a shutter 104 and a lens module 106. The laser source 102 emits laser beams toward a surface of the work-piece 80. The laser source 102 can be selected from a group consisting of gas lasers, excimer lasers and solid-state lasers depending on composition of the work-piece 80. If the material of the work-piece 80 is, for example, glass or porcelain, a gas laser is preferable. If the material of the work-piece 80 is, for example, metal or plastic, a solid-state laser is preferable. In this preferred embodiment, the laser source 102 is a solid-state laser such as, for example, a neodymium-doped yttrium-aluminium garnet (Nd:YAG) laser source with a wavelength of 800 nanometers, a ytterbium-doped yttrium-aluminium garnet (Yd:YAG) laser source with a wavelength of 940 nanometers or a neodymium-doped vanadate (Nd:Vanadate) laser source with a wavelength in a range from 1047 nanometers to 1064 nanometers. Additionally, in order to keep the laser source 102 working stably, a laser-cooling device 1022 is connected with the laser source 102 for cooling the laser source 102.

The laser beams emitted from the laser source 102 are transmitted to the shutter 104. The shutter 104 controls an intensity of the laser beams. For example, if the shutter 104 is completely opened, the laser beams completely pass through the shutter 104, and the intensity of the laser beams can be said to be at a maximum. If the shutter 104 is completely closed, the laser beams can not pass through the shutter 104, and, the intensity of the laser beams can be said to be at a minimum. The shutter 104 is controlled depending on the fineness required for working on the surface of the work-piece 80.

The lens module 106 is used for focusing the laser beams from the shutter 104 to the work-piece 80. The lens module 106 includes a first lens assembly 108 and a lens barrel 110. The first lens assembly 108 includes a first lens set 1082 having a positive refractive power adjacent to the laser source 102 and a second lens set 1084 having a negative refractive power adjacent to the work-piece 80 along a transmission direction of the laser beams. The first lens set 1082 and the second lens set 1084 are coaxial and are contained in the lens barrel 110. A relative distance between the first lens set 1082 and the second lens set 1084 is changeable in the lens barrel 110 based on a focus controlling unit 50 connected with the lens barrel 110 so as to adjust a focus of the lens module 106. The index of refraction of the first lens set 1082 and the index of refraction of the second lens set 1084 are respectively represented by k1 and k2, the distance between the first lens set 1082 and the second lens set 1084 is represented by d12, and the index of refraction of the first lens assembly 108 is represented by k12. Wherein, k1, k2, k12 and d12 are related by the following formula:

$$d12=(k1+k2-k12)/(k1\times k2) \quad (1)$$

An effective focal length f1 of the lens module 106 satisfies the following equation:

$$f1=1/k12 \quad (2)$$

A back focal length f2 of the lens module 106 satisfies the following equation:

$$f2=(1-d12\times k1)/k12=f1\times(1-d12\times k1) \quad (3)$$

Therefore, the effective focal length f1 and the back focal length f2 can be changed by changing the distance d12 so as to change a position of a focal point of the lens module 106 on the surface of the work-piece 80. Alternatively, the first lens assembly 108 may include three, four or more lenses.

The laser beams from the laser source module 10 are guided onto the surface of the work-piece 80 to machine the work-piece 80. The work-piece 80 can be disposed on a worktable 60. The worktable 60 can be moved horizontally and vertically, and it also can tilt and rotate. In order to avoid the temperature of the work-piece 80 becoming too high, which is disadvantageous to machining, a work-piece cooler 70 can be positioned between the worktable 60 and the work-piece 80 for cooling the work-piece 80. In this preferred embodiment, the work-piece cooler 70 can be, for example, a thermal electric cooler.

The feedback module 20 includes a laser monitoring assembly 200 and a processing unit 30. The laser monitoring assembly 200 receives the reference laser beams that are reflected by the work-piece 80 as an optical signal and transforms the optical signal into an electronic signal. The laser monitoring assembly 200 includes a second lens assembly 202 and an optical detector 204. The second lens assembly 202 includes a third lens set 2022 having a negative refractive power and a fourth lens set 2024 having a positive refractive power being coaxial and positioned in turn from the work-piece 80 to the optical detector 204 along a transmission direction of the reference laser beams. The third lens set 2022 diverges the reference laser beams and the fourth lens set 2024 converges the diverged reference laser beams to project onto the optical detector 204. The optical detector 204 receives the projected reference laser beams as the optical signal and transforms the optical signal into an electronic signal and further transmits the electronic signal to the processing unit 30.

The laser-controlling module 40 is used for controlling the parameters of the laser source, for example, the pulse energy, the pulse durations, the pulse repetition rate etc. The processing unit 30 receives the electronic signal from the optical detector 204, and then processes the electronic signal. After the processing the electronic signal, feedback signal of the position being machined of the work-piece 80, for example, the distance between the position being machined of the work-piece 80 and the laser source module 10 etc. is acquired. The processing unit 30 transmits the feedback signal processed to the laser-controlling module 40 and the focus controlling unit 50. The laser-controlling module 40 can optimize the working parameters of the laser source 102, for example, the intensity of the laser beams, according to the feedback signal receiving from the processing unit 30. The focus controlling unit 50 can control the lens barrel 110 to adjust the focal length of the lens module 106, and thus focusing the laser beams on the surface of the work-piece 80.

In this preferred embodiment, the first lens assembly 108 including the first lens set 1082 and the second lens set 1084 is used in the apparatus for processing a work-piece 100 to adjust the focal length of the lens module 106. Moreover, the feedback module 20 is used for receiving and processing the information for machining the work-piece 80. The laser-controlling module 40 and focus controlling unit 50 confirm and optimize the working parameters of the laser source module 10 so that smoothness of the work-piece is enhanced.

Figure 2:
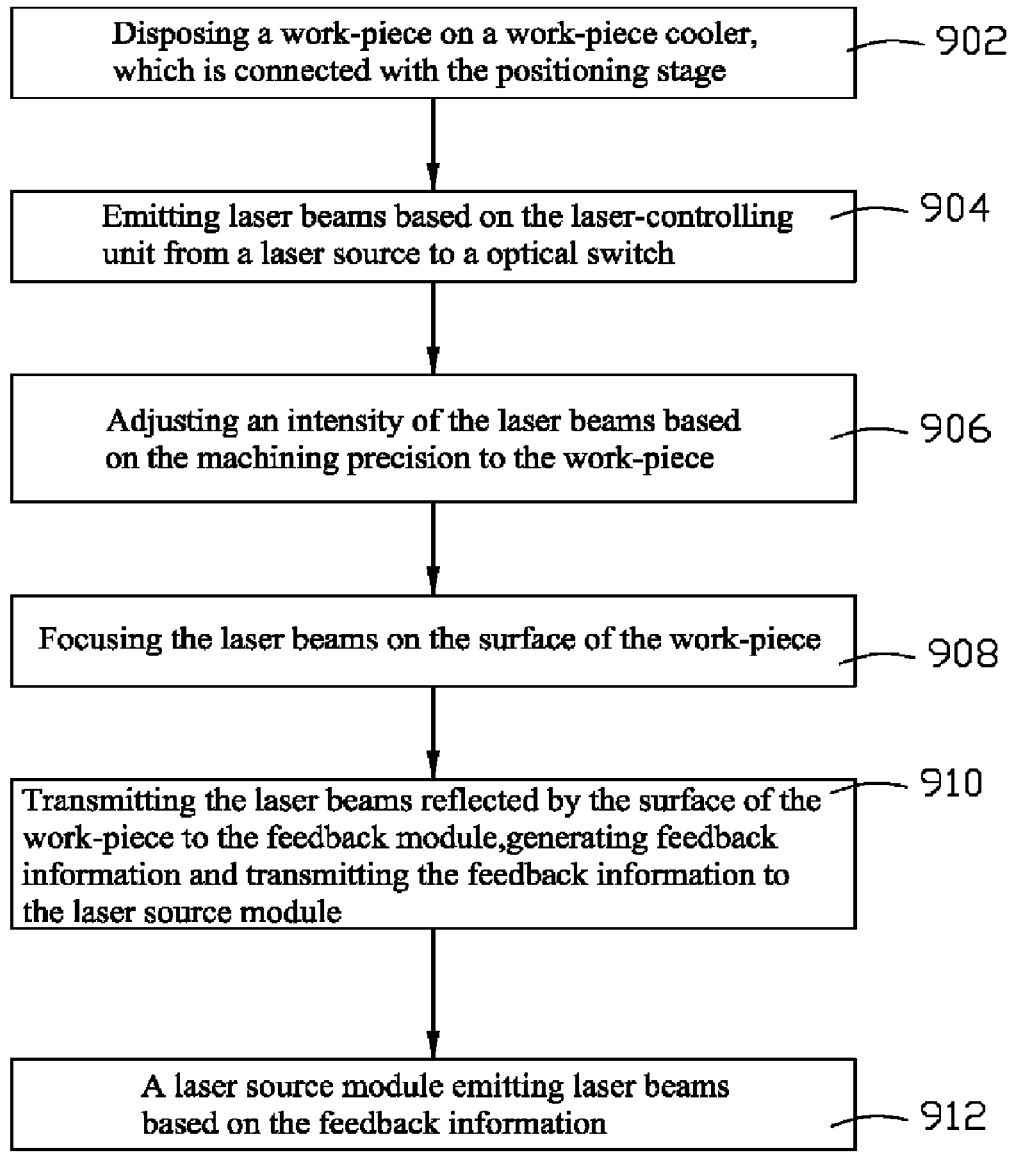
FIG. 2 is a schematic flow chart of method for processing a work-piece in accordance with a second preferred embodiment.

Referring to FIGS. 1 and 2, a method for machining using the apparatus 100 of the first embodiment is described below:

In step 902, the work-piece 80 is disposed on the work-piece cooler 70, which is connected with the worktable 60. The work-piece cooler 70 is used for cooling the work-piece 80 to avoid overheating of the work-piece 80.

In step 904, the laser source 102 emits laser beams using the preset working parameters based on the laser-controlling module 40 and transmits the laser beams to the shutter 104. The laser source 102 is controlled by the laser-controlling module 40 and generates laser beams for machining the work-piece 80. The laser-controlling module 40 presets working parameters of the laser source 102. The working parameters include, for example, the pulse energy, the pulse duration, the repetition rate etc. In this preferred embodiment, the pulse energy is preset in the range from 30 micro-joules to 300 micro-joules, the pulse duration is preset in the range from 30 microseconds to 3000 microseconds and the range from 100 microseconds to 500 microsecond is preferable, and the repetition rate is preset in the range from 1 kilo-Hz to 10 kilo-Hz.

In step 906, the shutter 104 adjusts an intensity of the laser beams based on the machining precision to the work-piece 80 required and the laser beams is transmitted to the lens barrel 110.

In step 908, the lens barrel 110 of the lens module 106 changes a relative position between the first lens set 1082 and the second lens set 1084 so as to focus the laser beams on the surface of the work-piece 80, and thus the surface of the work-piece 80 is machined by the laser beams. The laser beams can be focused to a focal spot with a range of size from 1 micrometer to 1000 micrometer and the range from 10 micrometer to 100 micrometer is preferable.

In step 910, the feedback module 20 receives the laser beams reflected by the surface of the work-piece 80, transforms the optical signal of the laser beams to an electrical signal, processes the electrical signal to achieve feedback signal of the position of the surface being machined of the work-piece 80, and then the surface of the work-piece 80. The feedback signal includes the distance between the position being machined of the work-piece 80 and the laser source module 10 etc.

In step 912, the laser-controlling module 40 optimizes the working parameters of the laser source 102, for example, the intensity of the laser beams, according to the feedback signal receiving from the feedback module 30. The focus controlling unit 50 controls the lens barrel 110 to adjust the focal length of the lens module 106, thus focusing the laser beams onto the surface of the work-piece 80 and thus machining the work-piece 80.

It is to be understood that the above-described embodiment is intended to illustrate rather than limit the invention. Variations may be made to the embodiment without departing from the spirit of the invention as claimed. The above-described embodiments are intended to illustrate the scope of the invention and not restrict the scope of the invention.

What is claimed is:

1. An apparatus for processing a work-piece, comprising:
a laser source configured for emitting laser beams,
a lens module configured for adjustably focusing the laser beams onto the work-piece, the lens module comprising a first lens assembly disposed in optical alignment with the laser source, the first lens assembly comprising a first lens set having a positive refractive power and a second lens set having a negative refractive power, wherein a distance between the first lens set of the first lens assembly and the second lens set of the first lens assembly satisfies the following equation:

$$d_{12}=(k_1+k_2-k_{12})/(k_1 \times k_2)$$

wherein $k_1$ represents an index of refraction of the first lens set, $k_2$ represents an index of refraction of the second lens set, $k_{12}$ represents an index of refraction of the first lens assembly, and an effective focal length $f_1$ of the first lens assembly satisfies the following equation:

$$f_1=1/k_{12}$$

and a back focal length $f_2$ of the first lens assembly satisfies the following equation:

$$f_2=(1-d_{12} \times k1)/k_{12}=f_1 \times (1-d_{12} \times k_1), \text{ and}$$

a feedback module configured for receiving the laser beams reflected from the work-piece and generating a feedback signal based on the reflected laser beams.

2. The apparatus as claimed in claim 1, further comprising a laser-controlling module configured for adjustably controlling operational parameters of the laser source based on the feedback signal.

3. The apparatus as claimed in claim 1, wherein the laser source module comprises a laser source for emitting laser beams and a shutter configured for regulating an intensity of the laser beams.

4. The apparatus as claimed in claim 1, wherein the laser source is selected from the group consisting of gas lasers, excimer lasers and solid-state lasers.

5. The apparatus as claimed in claim 4, wherein the laser source is a solid-state laser, which is selected from the group consisting of Nd-YAG lasers, Yb-YAG lasers and Nd-Vanadate lasers.

6. The apparatus as claimed in claim 1, further comprising a laser-cooling device configured for cooling the laser source.

7. The apparatus as claimed in claim 1, wherein the feedback module comprises an optical detector, a second lens assembly configured for projecting the laser beams reflected from the work-piece onto the optical detector, and a processing unit, the optical detector being configured for generating an electrical signal and transmitting the electrical signal to the processing unit, the processing unit being configured for generating the feedback signal based on the electrical signal.

8. The apparatus as claimed in claim 1, further comprising a worktable configured for supporting the work-piece thereon, the worktable being moveable horizontally and vertically.

9. The apparatus as claimed in claim 1, wherein the worktable further comprises a work-piece cooler configured for cooling the work-piece.

10. The apparatus as claimed in claim 9, wherein the work-piece cooler is a thermal electric cooler.

* * * * *